United States Patent
Chang et al.

(10) Patent No.: US 11,005,987 B2
(45) Date of Patent: May 11, 2021

(54) SLIDING EVENT PROCESSING METHOD, ELECTRONIC DEVICE AND STORAGE MEDIUM

(71) Applicant: BEIJING XIAOMI MOBILE SOFTWARE CO., LTD., Beijing (CN)

(72) Inventors: Qun Chang, Beijing (CN); Chunming Xiao, Beijing (CN); Lifang Yu, Beijing (CN); Ruyue Geng, Beijing (CN); Shang Gao, Beijing (CN); Hai Long, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/656,098

(22) Filed: Oct. 17, 2019

(65) Prior Publication Data

US 2020/0128125 A1    Apr. 23, 2020

(30) Foreign Application Priority Data

Oct. 19, 2018  (CN) .......................... 201811223526.0

(51) Int. Cl.
*H04M 1/73*    (2006.01)
*H04W 52/02*    (2009.01)
(Continued)

(52) U.S. Cl.
CPC ......... *H04M 1/73* (2013.01); *H04M 1/72403* (2021.01); *H04M 1/72448* (2021.01); *H04W 52/0209* (2013.01)

(58) Field of Classification Search
CPC ............... H04M 1/73; H04M 1/72522; H04M 1/72563; H04M 1/0237; H04M 1/0245; H04W 52/0209
See application file for complete search history.

(56) References Cited

U.S. PATENT DOCUMENTS 8,046,721 B2 * 10/2011 Chaudhri ............ G06F 3/04883
                                                    715/863
8,538,496 B2 *  9/2013 Yeh ..................... H04M 1/0237
                                                    345/169
(Continued)

FOREIGN PATENT DOCUMENTS

CN          1538717 A     10/2004
CN        103309588 A      9/2013
(Continued)

OTHER PUBLICATIONS

Extended European Search Report Issued in European Application No. 192041176 dated Dec. 18, 2019, (8p).
(Continued)

*Primary Examiner* — Julio R Perez
(74) *Attorney, Agent, or Firm* — Arch & Lake LLP (57) ABSTRACT

A method, an electronic device, and a storage medium are provided for a sliding event. The method includes: when a first sliding event is received, it is determined whether a second sliding event is received within a preset time interval, where the first sliding event and the second sliding event refer to two adjacent sliding operations on a sliding cover of an electronic device, which are detected by the electronic device; and when the second sliding event is received within the preset time interval, neither of the first sliding event and the second sliding event is responded, or either of the first sliding event and the second sliding event is responded.

9 Claims, 7 Drawing Sheets

(51) Int. Cl.
*H04M 1/72403* (2021.01)
*H04M 1/72448* (2021.01)

(56) References Cited

U.S. PATENT DOCUMENTS

| | | | |
|---|---|---|---|
| 9,367,232 B2* | 6/2016 | Platzer | G06F 1/1626 |
| 9,571,631 B1* | 2/2017 | Rownin | H04W 4/027 |
| 2003/0104850 A1* | 6/2003 | Lai | G06F 1/1683 |
| | | | 455/575.7 |
| 2009/0016029 A1* | 1/2009 | Liu | H04M 1/0237 |
| | | | 361/727 |
| 2010/0216447 A1 | 8/2010 | Park et al. | |
| 2015/0370427 A1* | 12/2015 | Zhang | G06F 3/04817 |
| | | | 715/835 |

FOREIGN PATENT DOCUMENTS

| | | |
|---|---|---|
| CN | 106201070 A | 12/2016 |
| CN | 107295127 A | 10/2017 |
| CN | 107682480 A | 2/2018 |
| CN | 107967108 A | 4/2018 |
| EP | 1406427 A2 | 4/2004 |
| EP | 2099201 A1 | 9/2009 |
| EP | 2720441 A1 | 4/2014 |

OTHER PUBLICATIONS

First Office Action to Chinese Application No. 201811223526.0, dated Apr. 16, 2020 with English translation, (15p).
Second Office Action to Chinese Application No. 201811223526.0 dated Oct. 12, 2020 with English translation, (15p).

* cited by examiner

SLIDING EVENT PROCESSING METHOD, ELECTRONIC DEVICE AND STORAGE MEDIUM

CROSS REFERENCE TO RELATED APPLICATION

This application is based upon and claims priority to Chinese Patent Application No. 2018112235260 filed on Oct. 19, 2018, the entire content of which is incorporated herein by reference.

TECHNICAL FIELD

The present disclosure relates to the field of information processing technology of electronic devices, and in particular to a sliding event processing method, an electronic device, and a storage medium.

BACKGROUND

Currently, when a user continuously slides a sliding cover of an electronic device such as a slider phone, a plurality of sliding events that may be detected by the electronic device are triggered, whereby the electronic device needs to frequently respond to the sliding events, such that the electronic device may run slower. Moreover, when the electronic device frequently responds to the sliding events, the screen is frequently turned on and off, which results in more energy consumption of the electronic device and affects the performance thereof.

SUMMARY

In order to overcome the problems existing in the related art, the present disclosure provides a sliding event processing method, an electronic device, and a storage medium.

According to a first aspect of the present disclosure, a method of processing a sliding event is provided, including: when a first sliding event is received, determining whether a second sliding event is received within a preset time interval, where the first sliding event and the second sliding event refer to two adjacent sliding operations on a sliding cover of an electronic device, which are detected by the electronic device; and when the second sliding event is received within the preset time interval, responding to neither of the first sliding event and the second sliding event, or responding to either of the first sliding event and the second sliding event.

According to a second aspect of the present disclosure, an electronic device is provided, which includes a sliding cover, one or more processors and a memory storing computer programs executable by the one or more processors. When the computer programs are invoked, the one or more processors are caused to perform: when a first sliding event is received, determining whether a second sliding event is received within a preset time interval, where the first sliding event and the second sliding event refer to two adjacent sliding operations on a sliding cover of an electronic device, which are detected by the electronic device; and ignoring at least one of the first and second sliding events when determining that the second sliding event is received within the preset time interval.

According to a third aspect of the present disclosure, a computer readable storage medium storing computer programs is provided, when the computer programs are invoked, one or more processors are caused to perform: when a first sliding event is received, determining whether a second sliding event is received within a preset time interval, where the first sliding event and the second sliding event refer to two adjacent sliding operations on a sliding cover of an electronic device, which are detected by the electronic device; and when the second sliding event is received within the preset time interval, responding to neither of the first sliding event and the second sliding event, or responding to either of the first sliding event and the second sliding event.

It should be understood that the above general descriptions and the below detailed descriptions are merely exemplary and explanatory, and are not intended to limit the present disclosure.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said', and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as "first", "second", "third", etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "in response to a determination that".

Figure 1:
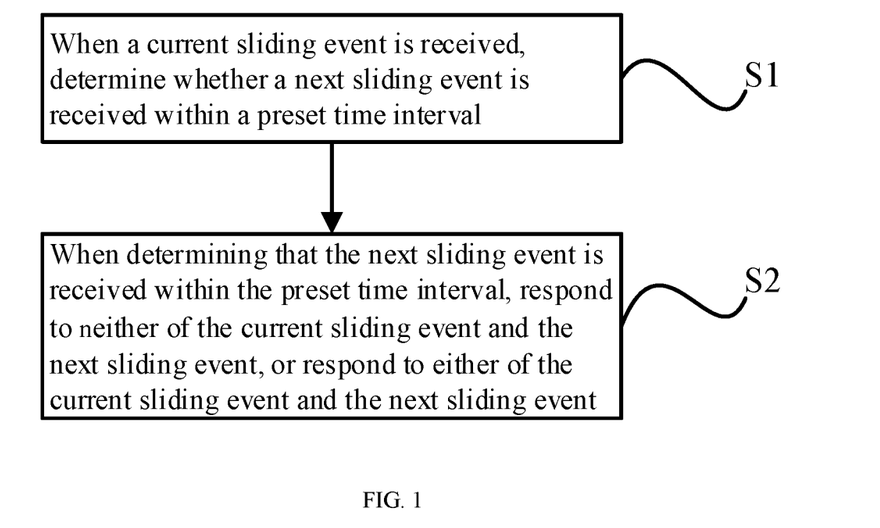
FIG. 1 is a flowchart illustrating a method of processing a sliding event according to an example of the present disclosure.

FIG. 1 is a flowchart illustrating a method of processing a sliding event according to an example of the present disclosure. The method may be applied to an electronic device, such as a slider phone, a slider tablet, or other mobile terminals including a sliding cover, and include the following steps S1-S2.

At step S1, when a current sliding event is received, it is determined whether a next sliding event is received within a preset time interval.

At step S2, when the next sliding event is received within the preset time interval, neither of the current sliding event and the next sliding event is responded, or either of the current sliding event and the next sliding event is responded.

The current sliding event and the next sliding event refer to two adjacent sliding operations on a sliding cover of the electronic device, which are detected by the electronic device. It may be understood that the current sliding event and the next sliding event are two adjacent sliding events input into the electronic device.

The step S1 may refer to that it is detected whether a triggering time interval between every two adjacent sliding events is less than the preset time interval, that is, it is determined whether the next sliding event is received within the preset time interval from a moment at which the current sliding event is received. The triggering time interval between two adjacent sliding events refers to an absolute value of a difference between a first moment at which one of the two adjacent sliding events is received and a second moment at which the other of the two adjacent sliding events is received. For example, it is assumed that the two adjacent sliding events include a first sliding event and a second sliding event. The first sliding event is received earlier than the second sliding event. The first sliding event is received at a first moment. The second sliding event is received at a second moment. The triggering time interval is equal to a difference between the second moment and the first moment.

At the step S1, the preset time interval may be set by a user according to his/her own needs, or may be set by a developer at development phase.

Figure 2:
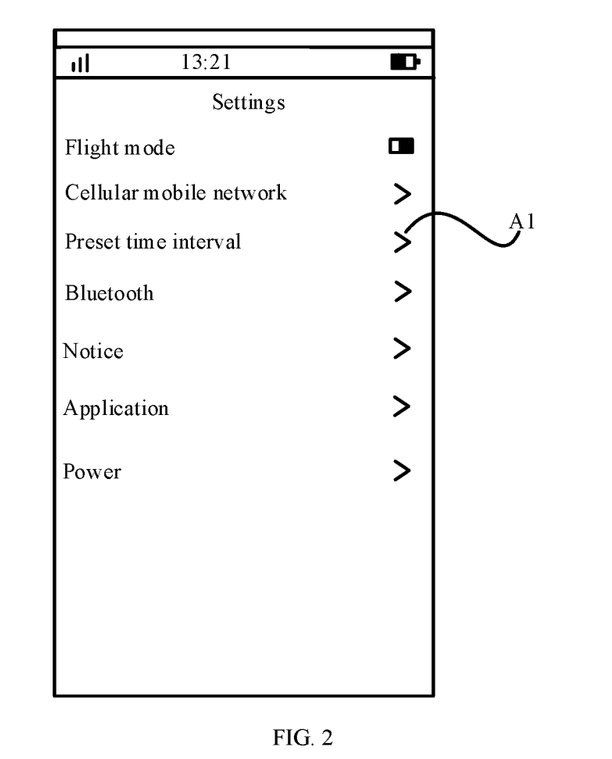
FIG. 2 is a schematic diagram illustrating a system setting interface when the interface displays a first control according to an example of the present disclosure.
Figure 3:
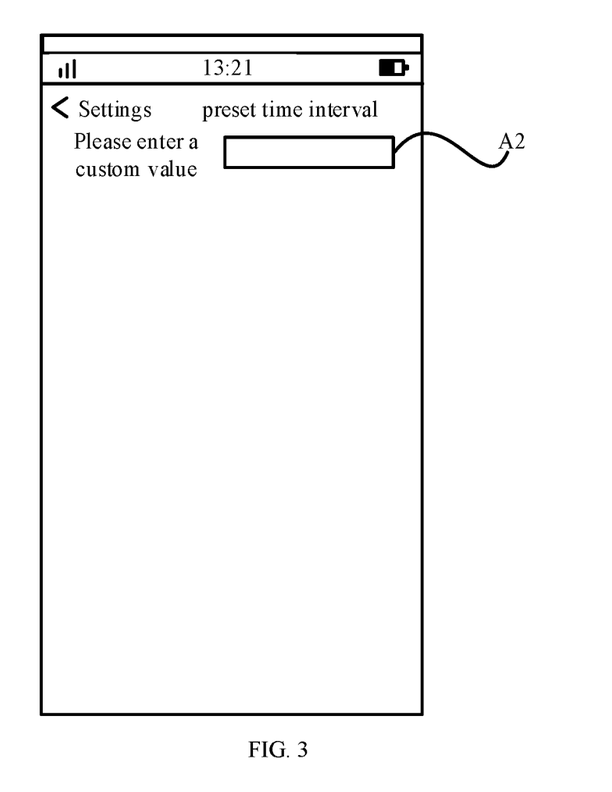
FIG. 3 is a schematic diagram illustrating an interface for setting a preset time interval according to an example of the present disclosure.

In an example, a function for setting the preset time interval may be configured in system settings of the electronic device such that the user may set the preset time interval according to his/her own needs. For example, when the user clicks the system settings and an instruction triggered by clicking the system settings is received, a system setting interface is displayed. A first control A1 for setting the preset time interval is displayed in the system setting interface. FIG. 2 is a schematic diagram illustrating a system setting interface when the interface displays a first control according to an example of the present disclosure. FIG. 3 is a schematic diagram illustrating an interface for setting a preset time interval according to an example of the present disclosure. As shown in FIGS. 2-3, when the user clicks the first control A1 and an instruction triggered by clicking the first control A1 is received, an interface for setting the preset time interval is switched to. The interface for setting the preset time interval displays an input field control A2. The user may enter a desired time interval value in the input field control A2, thereby implementing flexible setting of the preset time interval.

In an example, a value of the preset time interval may be 0.33 seconds. In other examples, the preset time interval may also be set to other values, which is not limited by the present disclosure.

At the step S2, when determining that the next sliding event is received within the preset time interval, the electronic device determines that the triggering time interval between the two adjacent sliding events is less than the preset time interval. Here, the two adjacent sliding events may also be referred as the two consecutive sliding events. In this case, it may be considered that two or more consecutive sliding events are generated by sliding the sliding cover frequently. The two or more consecutive sliding events are regarded as invalid events. In response, none of the sliding events is responded, or one of the sliding events is responded. None of the sliding event is responded, which may refer to all of the sliding events are ignored, without performing any operation according to the sliding events. One of the sliding events is responded, which may refer to that in a case that a plurality of sliding events are received, only one of the sliding events is responded and not all of the sliding events are responded. In sum, the electronic device responds to no more than one sliding event and ignores the other sliding event among the consecutive sliding events. In other words, the electronic device ignores at least one of the consecutive sliding events when the electronic device detects these consecutive sliding events during a preset time interval.

In some examples, responding to a sliding event may include at least one of the following acts: manipulating a screen of the electronic device; manipulating a specified application in the electronic device; manipulating multimedia playing on the electronic device; or manipulating power of the electronic device. For example, the acts may include waking up a screen, locking a screen, activating or enabling a specified application, closing a specified application, playing music or video, pausing or stopping playing music or video, powering off, powering on, or the like. The specified application is any application installed in the electronic device, and it may be preset by the developer, or may be downloaded in advance from an application store by the user according to his/her own needs. When the specified application is pre-installed in the electronic device by the developer, the developer needs to configure related functions for the electronic device at development phase, and the specific implementation manner may be obtained by combining the related contents of the present disclosure and the related art, which are not described herein again. For example, when a user frequently uses a chat application, he/she may set the response to a sliding event to turn the chat application on or off in the system settings.

In some examples, activating or enabling the specified application may refer to operating the specified application in a foreground of the electronic device. Closing the specified application may refer to operating the specified application in a background of the electronic device, or making the specified application in an inactivated state.

Hereinafter, taking the responses to the sliding events include activating a specified application and closing a specified application as an example, an application scenario of the sliding event processing method provided by examples of the present disclosure will be described.

In the application scenario, if an electronic device receives at least two sliding events and the triggering time interval between every two adjacent sliding events is less than or equal to a preset time interval, it is identified that these sliding events are invalid. At this time, the electronic device does not respond to any of the sliding events and keeps a current operating state. However, if there are two adjacent sliding events among a plurality of consecutive sliding events with a triggering time interval greater than the preset time interval, for example, the two adjacent sliding events with the triggering time interval greater than the preset time interval include a first sliding event and a second sliding event, and a receiving moment of the first sliding event is earlier than that of the second sliding event, it is identified that the first sliding event is valid. At this time, the electronic device may respond to the first sliding event so as to turn the specified application on or off. Before the electronic device activates a specified application in response to the sliding event, the specified application may be in an inactivated state or be operated in a background of the electronic device. When the electronic device activates the specified application in response to the sliding event, if a screen of the electronic device is currently in a locked mode, the electronic device may wake up the screen first and then operate the specified application in the foreground of the electronic device; if the screen of the electronic device is currently in an unlocked mode, the electronic device operates the specified application directly in the foreground. Before the electronic device closes the specified application in response to the sliding event, the specified application may be in an activated state. When the electronic device closes the specified application in response to the sliding event, regardless of whether the screen of the electronic device is currently in the locked mode or the unlocked mode, the electronic device directly closes the specified application.

Thus, according to the examples of the present disclosure, in a case where the time interval between every two adjacent sliding events is less than or equal to the preset time interval, none of the sliding events is responded or only one of the sliding events is responded. When the user frequently slides the sliding cover, the electronic device is prevented from responding to all of the consecutive sliding events, which effectively avoids the decrease of the running speed of the electronic device, helps to avoid that a memory of the electronic device is occupied due to respond to an invalid operation, reduces the energy loss of the electronic device, improves the stability of the operation of the electronic device, and extend the life time of the electronic device.

Figure 4:
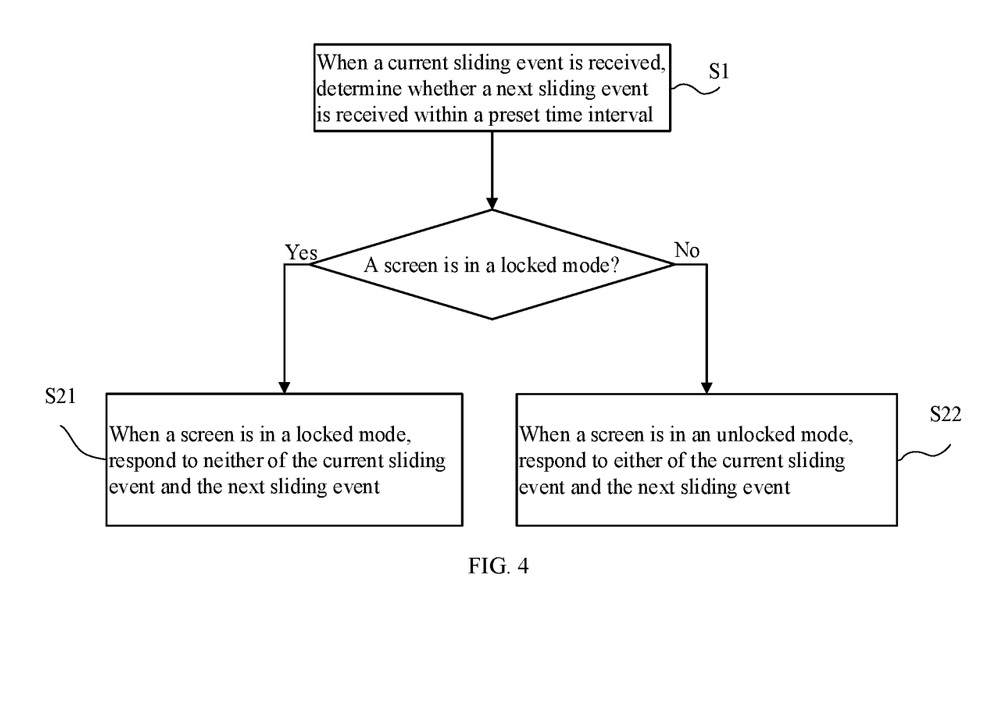
FIG. 4 is a flowchart illustrating a method of processing a sliding event according to an example of the present disclosure.

In an example, the step S2, i.e., when the next sliding event is received within the preset time interval, neither of the current sliding event and the next sliding event is responded, is performed when the screen is in the locked mode; and/or, the step S2, i.e. when the next sliding event is received within the preset time interval, either of the current sliding event and the next sliding event is responded, is performed when the screen is in the unlocked mode. Based on this, FIG. 4 is shown, which is a flowchart illustrating a method of processing a sliding event according to an example of the present disclosure. In the method shown in FIG. 4, the step S2 may include the following steps:

At step S21, in a case where the screen is in the locked mode, if the next sliding event is received within the preset time interval, neither of the current sliding event and the next sliding event is responded.

At step S22, in a case where the screen is in the unlocked mode, if the next sliding event is received within the preset time interval, either of the current sliding event and the next sliding event is responded.

Therefore, according to the examples of the present disclosure, the step, i.e., when the next sliding event is received within the preset time interval, neither of the current sliding event and the next sliding event is responded, is performed when the screen is in the locked mode, which facilitates to further avoid that the electronic device respond to an invalid sliding event, avoid that a memory of the electronic device is occupied due to respond to an invalid sliding event, reduce the energy loss of the electronic device, and improve the stability of the operation of the electronic device. The step, i.e., when the next sliding event is received within the preset time interval, either of the current sliding event and the next sliding event is responded, is performed when the screen is in the unlocked mode. Thereby, in the unlocked mode, by responding to one of a plurality of consecutive sliding events, it is avoided that all sliding events are ignored to affect the normal user requirements.

Figure 5:
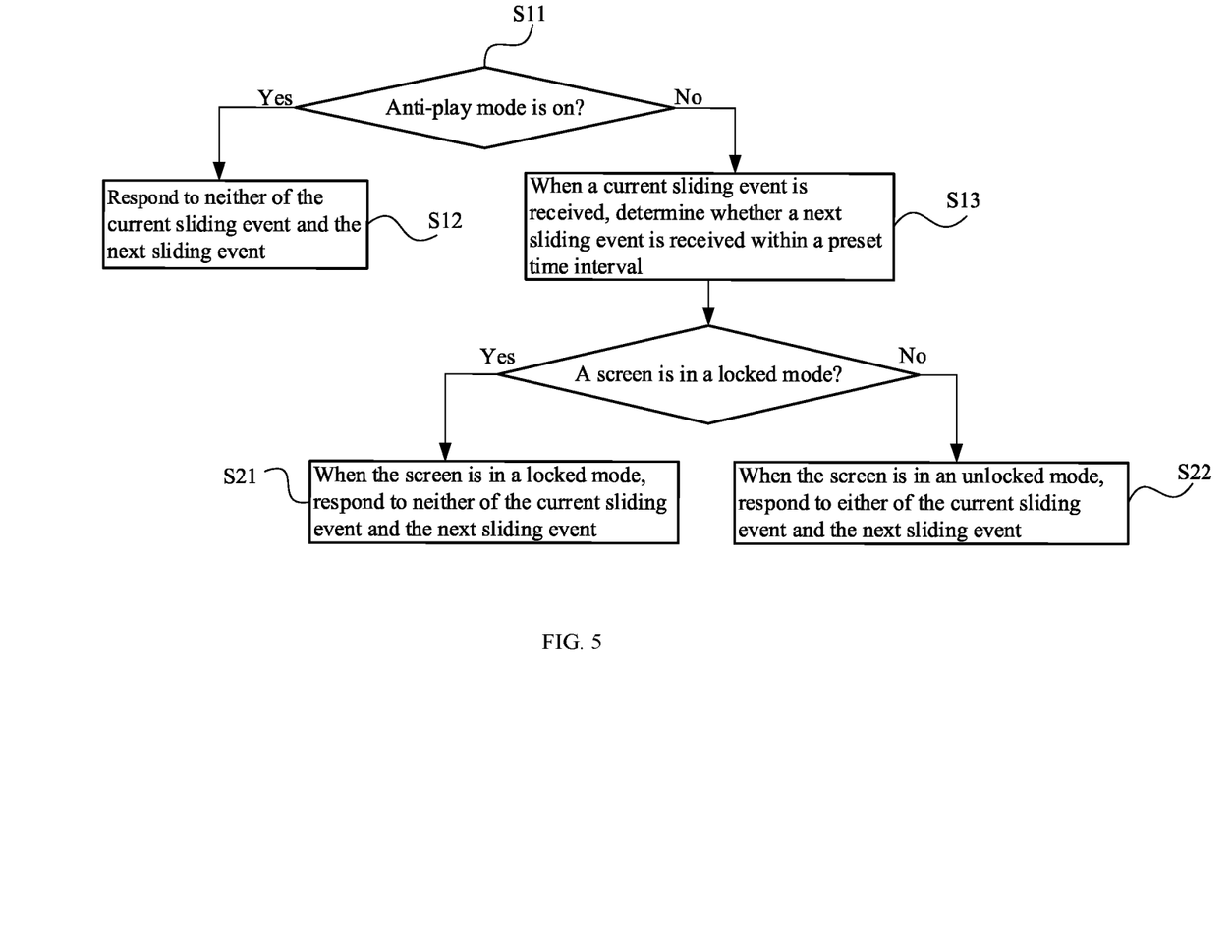
FIG. 5 is a flowchart illustrating a method of processing a sliding event according to an example of the present disclosure.

In an example, based on any of the foregoing examples, as shown in FIG. 5, which is a flowchart illustrating a method of processing a sliding event according to an example of the present disclosure, before determining whether the next sliding event is received within the preset time interval, the method may further include the following steps S11-S13.

At step S11, it is determined whether an anti-play mode is on.

At step S12, when the anti-play mode is on, neither of the current sliding event and the next sliding event is responded.

At step S13, when the anti-play mode is off, the step, determining whether the next sliding event is received within the preset time interval, is performed.

Figure 6:
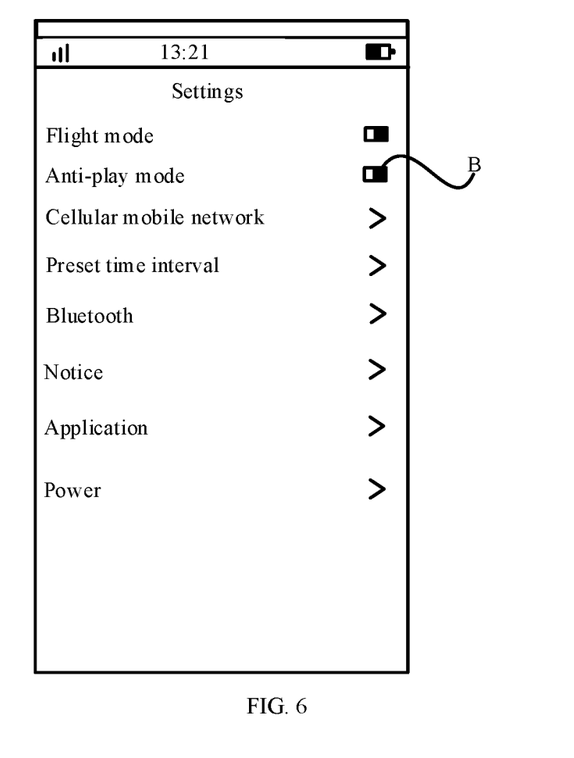
FIG. 6 is a schematic diagram illustrating an interface including an anti-play mode according to an example of the present disclosure.

In some examples, as shown in FIG. 6, which is a schematic diagram illustrating an interface including an anti-play mode according to an example of the present disclosure, a second control B to turn on or turn off the anti-play mode may be configured in the system settings of the electronic device. In this way, the user may turn on the anti-play mode in an off state or turn off the anti-play mode in an on state by clicking the second control B. The anti-play mode refers to a mode in which the electronic device does not respond to any sliding event.

At the step S11, the electronic device may determine the on or off state of the anti-play mode by searching for state recording information for the second control B.

The step S11 may be performed when the current sliding event is received, or may be performed before the current sliding event is received, which is not limited by the examples of the present disclosure. If the step S11 is performed before the current sliding event is received, it may be considered that the electronic device has known whether the anti-play mode is on when recording the state of the second control B. In this way, the step S11 may be performed when the electronic device records the state of the second control B.

Therefore, according to the examples of the present disclosure, by adding the anti-play mode in the system settings of the electronic device, whether to respond to the sliding event is determined according to the current state (on or off) of the anti-play mode, so that the user may set whether the electronic device is in the anti-play mode according to his/her own needs, thereby meeting more user needs and improving user experience.

In an example, based on any of the foregoing examples, before determining whether the next sliding event is received within the preset time interval, the method may further include the following steps:

At step S3, when it is detected that current power of the electronic device is less than a preset power threshold, and/or current operating speed of the electronic device is less than a preset speed threshold, neither of the current sliding event and the next sliding event is responded.

With respect to the specific technical means for the detection of the current power and the current operating speed of the electronic device, reference may be made to the related art, and details are not described herein again. The preset power threshold and the preset speed threshold may be pre-set by the developer at development phase, or may be pre-set by the user according to his/her own needs. The specific values of the preset power threshold and the preset speed threshold are not limited by the examples of the present disclosure.

Figure 7:
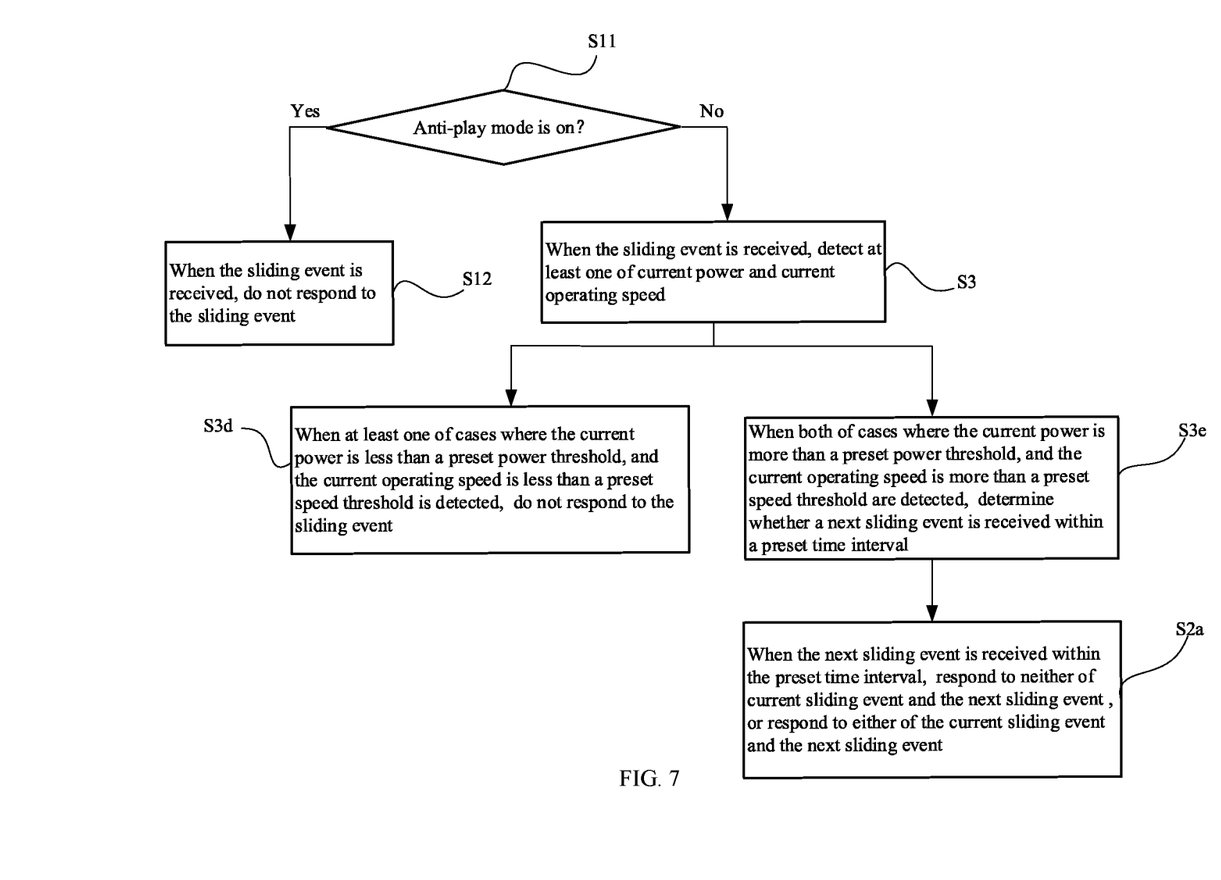
FIG. 7 is a flowchart illustrating a method of processing a sliding event according to another example of the present disclosure.

In some examples, when the current sliding event is received, the step S3 may be performed. Based on this, when the step S3 is added according to the examples shown in the steps S11 to S13, FIG. 7 is shown, which is a flowchart illustrating a method of processing a sliding event according to another example of the present disclosure, the method may include the following steps S11, S12, S3, S3d, S3e and S2a.

At step S11, it is determined whether an anti-play mode is on.

At step S12, in a case where the anti-play mode is on, when a sliding event is received, the sliding event is not responded.

At step S3, in a case where the anti-play mode is off, when the sliding event is received, the current power and/or the current operating speed are detected.

At step S3d, when it is detected that the current power is less than the preset power threshold, and/or the current operating speed is less than the preset speed, the sliding event is not responded.

At step S3e, when it is detected that the current power is greater than or equal to the preset power threshold, and the current operating speed is greater than or equal to the preset speed, it is determined whether the next sliding event is received within the preset time interval.

At step S2a, when the next sliding event is received within the preset time interval, neither of the current sliding event and the next sliding event is responded, or either of the current sliding event and the next sliding event is responded.

The description of any of the above steps may refer to the foregoing related contents in the examples of the present disclosure, and details thereof are not described herein again. In addition, based on the example shown in FIG. 4, the step S2a may include the following steps S2a1, S2a2 and S2a3.

At step S2a1, when the next sliding event is received within the preset time interval, it is determined whether the screen is currently in the locked mode.

At step S2a2, when the screen is currently in the locked mode, neither of the current sliding event and the next sliding event is responded.

At step S2a3, when the screen is currently in the unlocked mode, either of the current sliding event and the next sliding event is responded.

Therefore, according to the examples of the present disclosure, in a case of low power and/or slow operating speed of the electronic device, none of the sliding events is responded, which helps to reduce the power loss and operation load of the electronic device, and to some extent, extend the life time of the electronic device under low power and improve the operating efficiency of the electronic device under high operating load.

Figure 8:
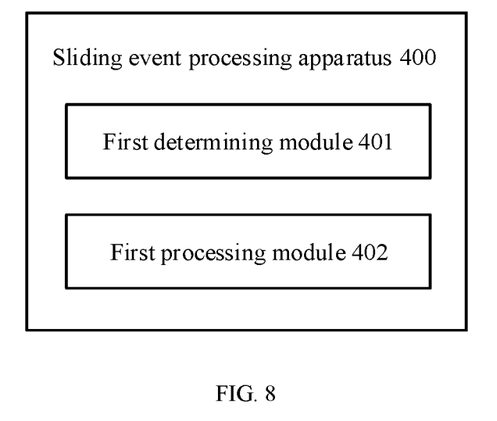
FIG. 8 is a structural block diagram illustrating an apparatus for processing a sliding event according to an example of the present disclosure.

Corresponding to examples of the sliding event processing method, as shown in FIG. 8, it is a structural block diagram illustrating an apparatus for processing a sliding event according to an example of the present disclosure. The apparatus 400 for processing a sliding event includes a first determining module 401 and a first processing module 402.

The first determining module 401 is configured to determine whether a next sliding event is received within a preset time interval when a current sliding event is received, where the current sliding event and the next sliding event refer to two adjacent sliding operations on a sliding cover of the electronic device, which are detected by an electronic device; and The first processing module 402 is configured to respond to neither of a current sliding event and a next sliding event, or respond to either of the current sliding event and the next sliding event, when the next sliding event is received within the preset time interval.

In some examples, responding to either of the current sliding event and the next sliding event includes at least one of followings: waking up a screen, locking a screen, activating a specified application, closing a specified application, playing music or video, pausing or stopping playing music or video, powering off, powering on or the like.

In an example, the first processing module 402 may include a first processing sub-module configured to respond to neither of the current sliding event and the next sliding event when a screen of the electronic device is in a locked mode.

In an example, the first processing module 402 may further include a second processing sub-module configured to respond to either of the current sliding event and the next sliding event when the screen of the electronic device is in an unlocked mode.

In an example, based on any of the above apparatus examples, the apparatus may further include a second determining module and a second processing module.

The second determining module is configured to determine whether an anti-play mode is on before determining whether the next sliding event is received within the preset time interval; and The second processing module is configured to respond to neither of the current sliding event and the next sliding event when the anti-play mode is on; when the anti-play mode is off, notify the first determining module to perform the step of determining whether the next sliding event is received within the preset time interval.

In an example, based on any of the above apparatus examples, the apparatus may further include a third processing module configured to detect current power and/or current operating speed of the electronic device, when it is detected that the current power is less than a preset power threshold, and/or the current operating speed is less than a preset speed, neither of the current sliding event and the next sliding event is responded.

Detailed implementation processes of functions and effects of the modules in the apparatus refer to implementation processes of corresponding steps in the methods, which are not described herein again.

The present disclosure further provides an electronic device. The electronic device includes a sliding cover, one or more processors, and a memory storing computer programs executable by the one or more processors. When the computer programs are invoked by the one or more processors, the one or more processors are caused to perform the sliding event processing method according to any of the above examples.

Figure 9:
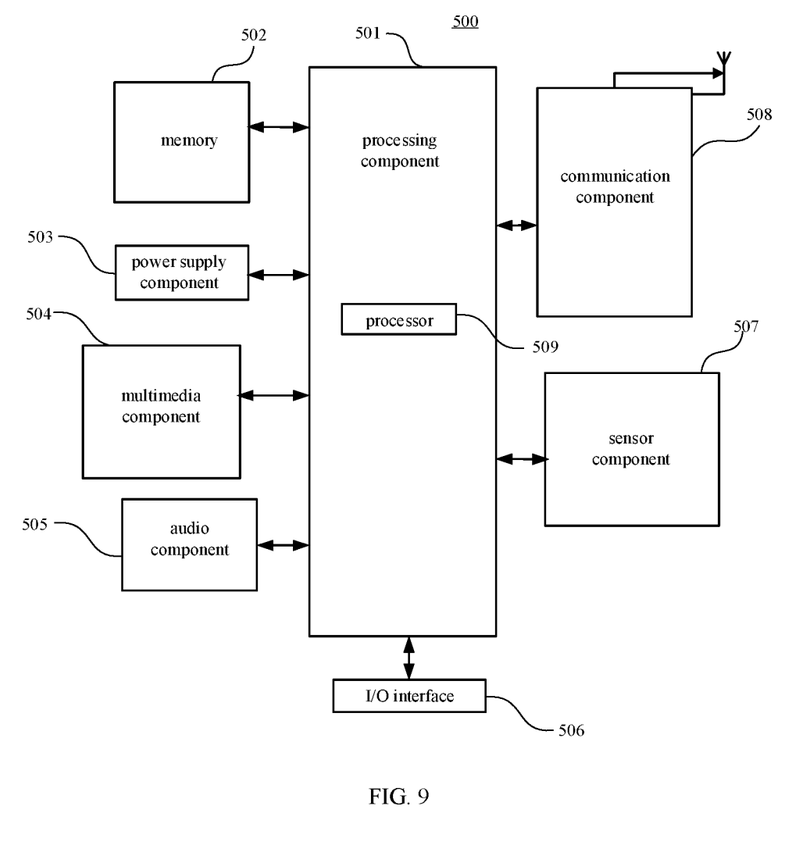
FIG. 9 is a structural block diagram illustrating an electronic device according to an example of the present disclosure.

FIG. 9 is a structural block diagram illustrating an electronic device according to an example of the present disclosure. The electronic device 500 may be a slide-type mobile phone, a mobile slide message transceiving device, a slide-type tablet device, a slide-type mobile medical device, a slide-type mobile fitness device, a slide-type personal digital assistant, and the like.

Referring to FIG. 9, the electronic device 500 may include one or more of the following components: a processing component 501, a memory 502, a power supply component 503, a multimedia component 504, an audio component 505, an input/output (I/O) interface 506, a sensor component 507, and a communication component 508.

The processing component 501 usually controls overall operations of the electronic device 500, such as operations relating to display, a telephone call, data communication, a camera operation and a record operation. The processing component 501 may include one or more processors 509 for executing instructions to complete all or a part of blocks of the above method. Further, the processing component 501 may include one or more modules to facilitate interaction between the processing component 501 and another component. For example, the processing component 501 may include a multimedia module to facilitate the interaction between the multimedia component 504 and the processing component 501.

The memory 502 is configured to store different types of data to support operations at the electronic device 500. Examples of such data include instructions, contact data, phonebook data, messages, pictures, videos, and so on for any application or method that operates on the electronic device 500. The memory 502 may be implemented by any type of volatile or non-volatile storage devices or a combination thereof, and the memory 502 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 503 supplies power for different components of the electronic device 500. The power supply component 503 may include a power supply management system, one or more power supplies, and other components associated with generating, managing and distributing power for the electronic device 500.

The multimedia component 504 includes a screen for providing an output interface between the electronic device 500 and a user. The screen may include a Touch Panel (TP) implemented as a touch screen for receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 504 may include a front camera and/or a rear camera. When the electronic device 500 is in an operation mode, such as a shooting mode or a video mode, the front camera and/or the rear camera may receive external multimedia data. Each of the front camera and the rear camera may be a fixed optical lens system or be capable of a focal length and an optical zoom capability.

The audio component 505 is configured to output and/or input an audio signal. For example, the audio component 505 includes a microphone (MIC). When the electronic device 500 is in an operation mode, such as a call mode, a record mode and a voice recognition mode, the microphone is configured to receive an external audio signal. The received audio signal may be further stored in the memory 502 or sent via the communication component 508. In some examples, the audio component 505 further includes a speaker for outputting an audio signal.

The I/O interface 506 provides an interface between the processing component 501 and a peripheral interface module. The above peripheral interface module may be a keyboard, a click wheel, a button, or the like. These buttons may include but not limited to, a home button, a volume button, a start button and a lock button.

The sensor component 507 includes one or more sensors for providing a state assessment in different aspects for the electronic device 500. For example, the sensor component 507 may detect an on/off state of the electronic device 500 and a relative location of components. For example, the components are a display and a keypad of the electronic device 500. The sensor component 507 may also detect a position change of the electronic device 500 or a component of the electronic device 500, presence or absence of a touch of a user on the electronic device 500, an orientation or acceleration/deceleration of the electronic device 500, and a temperature change of electronic device 500. The sensor component 507 may include a proximity sensor for detecting the existence of a nearby object without any physical touch. The sensor component 507 may further include an optical sensor, such as a CMOS or CCD image sensor used in an imaging application. In some examples, the sensor component 507 may further include an acceleration sensor, a gyro sensor, a magnetic sensor, a pressure sensor, or a temperature sensor.

The communication component 508 is configured to facilitate wired or wireless communication between the electronic device 500 and other devices. The electronic device 500 may access a wireless network based on a communication standard, such as WiFi, 2G, 3G, 4G or 5G, or a combination thereof. In an example, the communication component 508 receives a broadcast signal or broadcast related information from an external broadcast management system via a broadcast channel. In an example, the communication component 508 may further include a Near Field Communication (NFC) module for promoting short-range communication. For example, the NFC module may be implemented based on radio frequency identification (RFID) technology, infrared data association (IrDA) technology, ultra-wideband (UWB) technology, Bluetooth (BT) technology and other technology.

In an example, the electronic device 500 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the above method.

Detailed implementation processes of functions and effects of units in the electronic device refer to implementation processes of corresponding steps in the method, which are not described herein again.

The apparatus examples and the electronic device examples refer to the partial description of the method examples, because they basically correspond to the method examples. The apparatus examples and the electronic device examples described above are merely illustrative, where the units described as separate components may be physically separated or not, and the components displayed as units may be physical units or not, i.e., may be located in one place or distributed to multiple network units. Some of the modules or all of the modules may be selected according to actual needs to achieve the purpose of the present disclosure. Those of ordinary skill in the art may understand and implement the present disclosure without any creative effort.

Corresponding to the above examples of the sliding event processing method, the present disclosure further provides a computer readable storage medium storing computer programs. When the computer programs are executed by the one or more processors 509 of the electronic device, the one or more processors 509 are caused to perform the above sliding event processing method.

The present disclosure may take the form of a computer program product implemented on one or more storage media having a program code thereon, including but not limited to a magnetic disk storage, a CD-ROM, an optical memory, etc. Computer usable storage media include permanent media and non-persistent media, removable media and non-removable media, and information storage may be implemented by any method or technology. Information may be computer readable instructions, data structures, modules of programs, or other data. Examples of computer storage media include, but are not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a compact disk read only memory (CD-ROM), a digital versatile disk (DVD) or other optical storages, a cartridge tape, a magnetic tape, a disk storage or other magnetic storage devices or any other non-transmission media that may be used to store information which may be accessed by a computing device.

After considering the specification and practicing the present disclosure, those skilled in the art may easily conceives other implementations of the present disclosure. The present disclosure is intended to include any variations, uses and adaptive changes of the present disclosure. These variations, uses and adaptive changes follow the general principle of the present disclosure and include common knowledge or conventional technical means in the art, which are not disclosed in the present disclosure. The specification and examples herein are intended to be illustrative merely and the real scope and spirit of the present disclosure are indicated by the claims of the present disclosure.

It should be understood that the present disclosure is not limited to the precise structure that have been described above and shown in the accompanying drawings, and can be modified and changed in various ways without departing from the scope of the present disclosure. The scope of the present disclosure is limited only by the appended claims.

The foregoing disclosure is merely illustrative of preferred examples of the present disclosure but not intended to limit it, and any modifications, equivalent substitutions, adaptations thereof made within the spirit and principles of the present disclosure shall be encompassed in the scope of protection of the present disclosure.

What is claimed is:

1. A method for processing a sliding event, comprising:
receiving a first sliding event by an electronic device comprising a slide cover determining whether a second sliding event is received within a preset time interval, wherein the first sliding event and the second sliding event refer to two adjacent sliding operations on the sliding cover of the electronic device, and the two adjacent sliding operations are detected by the electronic device;
determining that the second sliding event is received within the preset time interval, determining whether a screen of the electronic device is in a locked mode;
detecting at least one of current power level or current operating speed of the electronic device;
responding to neither of the first sliding event and the second sliding event in response to determining that the screen is in the locked mode and that the detected current power level is less than a preset power threshold, or the current operating speed is less than a preset speed threshold; and
responding to either of the first sliding event and the second sliding event in response to determining that the screen is in an unlocked mode.

2. The method according to claim 1, further comprising:
determining whether an anti-play mode is on;
when the anti-play mode is on, responding to neither of the first sliding event and the second sliding event; and
when the anti-play mode is off, determining whether the second sliding event is received within the preset time interval.

3. The method according to claim 1, wherein, responding to either of the first sliding event and the second sliding event comprises at least one of:
manipulating the screen of the electronic device;
manipulating a specified application in the electronic device;
manipulating multi-media playing on the electronic device; or
manipulating power of the electronic device.

4. An electronic device, comprising:
a sliding cover;
one or more processors; and
a memory storing computer programs executable by the one or more processors,
wherein when the computer programs are invoked, the one or more processors are caused to perform operations comprising:
receiving a first sliding event by an electronic device comprising a slide cover determining whether a second sliding event is received within a preset time interval, wherein the first sliding event and the second sliding event refer to two adjacent sliding operations on the sliding cover of the electronic device, and the two adjacent sliding operations are detected by the electronic device;
determining that the second sliding event is received within the preset time interval, determining whether a screen of the electronic device is in a locked mode;
detecting at least one of current power level or current operating speed of the electronic device;
responding to neither of the first sliding event and the second sliding event in response to determining that the screen is in the locked mode and that the detected current power level is less than a preset power threshold, or the current operating speed is less than a preset speed threshold; and
responding to either of the first sliding event and the second sliding event in response to determining that the screen is in an unlocked mode.

5. The electronic device according to claim 4, wherein the one or more processors are further caused to perform following operations comprising:

determining whether an anti-play mode is on;

when the anti-play mode is on, responding to neither of the first sliding event and the second sliding event; and when the anti-play mode is off, determining whether the second sliding event is received within the preset time interval.

6. The electronic device according to claim 4, wherein responding to either of the first sliding event and the second sliding event comprises at least one of:

manipulating the screen of the electronic device;

manipulating a specified application in the electronic device;

manipulating multi-media playing on the electronic device; or manipulating power of the electronic device.

7. A non-transitory computer readable storage medium storing computer programs, wherein, when the computer programs are invoked, one or more processors are caused to perform operations comprising:

determining that the second sliding event is received within the preset time interval, determining whether a screen of the electronic device is in a locked mode;

detecting at least one of current power level or current operating speed of the electronic device;

responding to neither of the first sliding event and the second sliding event in response to determining that the screen is in the locked mode and that the detected current power level is less than a preset power threshold, or the current operating speed is less than a preset speed threshold; and responding to either of the first sliding event and the second sliding event in response to determining that the screen is in an unlocked mode.

8. The storage medium according to claim 7, wherein, the one or more processors are further caused to perform following operations comprising:

determining whether an anti-play mode is on;

when the anti-play mode is on, responding to neither of the first sliding event and the second sliding event; and when the anti-play mode is off, determining whether the second sliding event is received within the preset time interval.

9. The storage medium according to claim 7, wherein responding to either of the first sliding event and the second sliding event comprises at least one of:

manipulating the screen of the electronic device;

manipulating a specified application in the electronic device;

manipulating multi-media playing on the electronic device; or manipulating power of the electronic device.

\* \* \* \* \*